(No Model.)

J. M. SNIDOW.
SAW TURNING DEVICE.

No. 438,119. Patented Oct. 7, 1890.

WITNESSES:
P. F. Cagle
L. Douville

INVENTOR:
John Milton Snidow
BY John A. Wiedersheim
ATTORNEY.

UNITED STATES PATENT OFFICE.

JOHN MILTON SNIDOW, OF BIG STONY CREEK, VIRGINIA, ASSIGNOR TO JOHN W. BOUGHTON, OF PHILADELPHIA, PENNSYLVANIA.

SAW-TURNING DEVICE.

SPECIFICATION forming part of Letters Patent No. 438,119, dated October 7, 1890.

Application filed December 6, 1889. Serial No. 332,853. (No model.)

To all whom it may concern:

Be it known that I, JOHN MILTON SNIDOW, a citizen of the United States, residing at Big Stony Creek, county of Giles, State of Virginia, have invented a new and useful Improvement in Saw-Turning Devices, which improvement is fully set forth in the following specification and accompanying drawings.

My invention consists of a device for turning a circular saw for sharpening and other purposes, the same embodying a dog adapted to engage with the teeth of the saw, and a lever for operating said dog; also a clamp, and, furthermore, of means for adjustably supporting said device.

Figure 1:
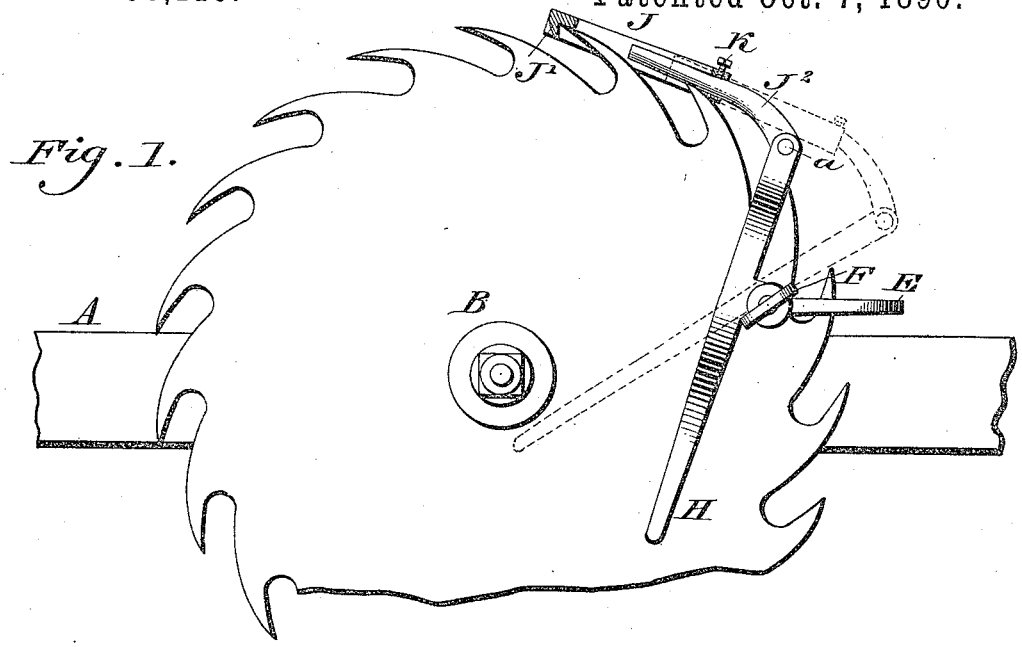
Figure 3:
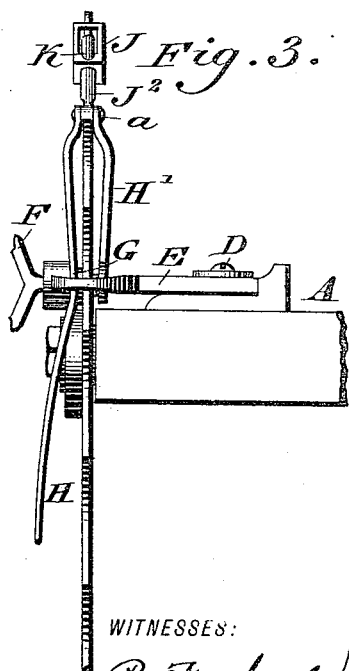
Figure 2:
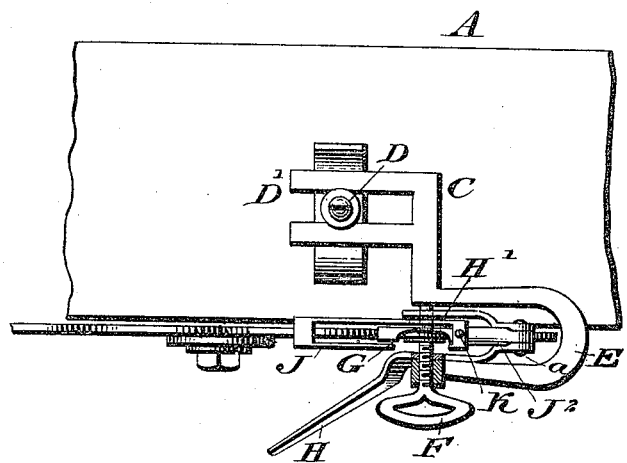

Figure 1 represents a side elevation, partly sectional, of a saw-turning device embodying my invention. Fig. 2 represents a top or plan view thereof. Fig. 3 represents an end view thereof, partly sectional.

Similar letters of reference indicate corresponding parts in the several figures.

Referring to the drawings, A represents a table or stand, which is provided with a bolt, axle, or arbor B for rotatingly supporting a saw to be sharpened.

C represents an arm, which is connected with the table A by means of a screw D, the same extending horizontally and having a longitudinally-extending slot D', through which said screw passes for purposes of adjustment. The arm is of angular form, having on its transverse limb a yoke E, which encircles the periphery of the saw, and carrying on its outer end a thumb or other screw F, which extends parallel to the arbor or bolt B, so as to tighten against the side of the saw. On the inner end of said screw is a swiveled head or washer G, which is adapted to bear against the saw when the screw is tightened.

Mounted on the screw F, between the yoke E and head G, is a lever H.

J designates a dog, which is located over the periphery of the saw and slotted to permit the entrance of one or more of the saw-teeth, the front end of said dog constituting a tooth J', which is adapted to engage with either of said teeth. The dog J is connected by a screw K with a rod $J^2$, which is pivoted to the lever H, whereby the dog may be nicely adjusted in relation to the teeth of the saw, and the slot D' permits the arm C, and consequently the yoke E, to be properly adjusted in relation to the periphery of the saw.

In order to steady the motions of the dog J, there is mounted on the inner limb of the yoke E a radial arm H', which is connected with the pivot $a$ of said dog and the lever H, the lever and arm occupying positions on opposite sides of the saw and having coincident axes.

The operation is as follows: The screw D is loosened and the lever H operated in one direction, whereby the dog J rides over the teeth of the saw and then drops, taking hold of one of the teeth. The lever is now operated in the opposite direction, whereby the dog draws the saw with it, thus turning the same. The screw is then tightened against the saw, thus clamping it, whereby the teeth thereof may be sharpened or otherwise acted upon. It is evident that by loosening the screw and operating the lever the saw may be entirely rotated and each tooth presented as desired.

Having thus described my invention, what I claim as new, and desire to secure by Letters Patent, is—

1. A device for turning a saw, consisting of an arm having a yoke or bend, a screw on one limb thereof, a lever mounted on said screw, and a tooth-engaging dog pivoted to said lever, the parts being combined substantially as described.

2. In a saw-turning device, a yoke secured to a table or stand, a clamping-screw therein, and a tooth-engaging dog pivotally attached to said yoke, substantially as described.

3. In a saw-turning device, a yoke secured to a table or stand, a clamping-screw therein, an operating-lever pivotally supported by said screw, and a dog adjustably connected to said lever, substantially as described.

JOHN MILTON SNIDOW.

Witnesses:
G. W. EASLEY,
WM. D. STRALEY.